No. 862,135. PATENTED AUG. 6, 1907.
H. B. CLARKE.
AUTOMATIC TROLLEY RETRACTING MECHANISM.
APPLICATION FILED MAR. 1, 1906.

Witnesses:
Geo. K. Mayer
J. R. Murphy

Inventor:
Henry B. Clarke,
by Albert N. Graves
Attorney.

No. 862,135. PATENTED AUG. 6, 1907.
H. B. CLARKE.
AUTOMATIC TROLLEY RETRACTING MECHANISM.
APPLICATION FILED MAR. 1, 1906.

Witnesses:

Inventor:
Henry B. Clarke
by Albert H. Graves
Attorney.

No. 862,135. PATENTED AUG. 6, 1907.
H. B. CLARKE.
AUTOMATIC TROLLEY RETRACTING MECHANISM.
APPLICATION FILED MAR. 1, 1906.

Witnesses:

Inventor:
Henry B Clarke
by Albert N Graves,
Attorney.

No. 862,135. PATENTED AUG. 6, 1907.
H. B. CLARKE.
AUTOMATIC TROLLEY RETRACTING MECHANISM.
APPLICATION FILED MAR. 1, 1906.

Witnesses:
Geo. N. Mayer
J. R. Murphy

Inventor:
Henry B. Clarke
by Albert N. Graves.
Attorney.

No. 862,135. PATENTED AUG. 6, 1907.
H. B. CLARKE.
AUTOMATIC TROLLEY RETRACTING MECHANISM.
APPLICATION FILED MAR. 1, 1906.

Witnesses:
Geo. M. Mayer
J. R. Murphy

Inventor:
Henry B. Clarke,
by Albert N. Graves.
Attorney.

No. 862,135. PATENTED AUG. 6, 1907.
H. B. CLARKE.
AUTOMATIC TROLLEY RETRACTING MECHANISM.
APPLICATION FILED MAR. 1, 1906.

Witnesses:
R. J. Jacker.
F. L. Belknap.

Inventor:
Henry B. Clarke
By Albert N. Graves
Atty.

UNITED STATES PATENT OFFICE.

HENRY B. CLARKE, OF HIGHLAND PARK, ILLINOIS.

AUTOMATIC TROLLEY-RETRACTING MECHANISM.

No. 862,135.  Specification of Letters Patent.  Patented Aug. 6, 1907.

Application filed March 1, 1906. Serial No. 303,709.

*To all whom it may concern:*

Be it known that I, HENRY B. CLARKE, a citizen of the United States, residing at Highland Park, in the county of Lake and State of Illinois, have invented certain new and useful Improvements in Automatic Trolley-Retracting Mechanisms, of which the following is a specification.

This invention relates to an improved automatic trolley retracting mechanism of that type adapted for drawing down the trolley pole and trolley thereon of an ordinary overhead-trolley electric railway.

Among the salient objects of the invention are to provide a mechanism in which the operation of retracting the trolley is inaugurated automatically, and is accomplished practically instantly and completely without the intervention of manual aid; to provide in such a mechanism means whereby the simple turning of a valve restores everything to normal operative position; to provide in such a mechanism an automatic clutch which is normally disengaged and permits the spring drum which connects the trolley cord to oscillate freely while the pole follows variations in height of the trolley wire, this spring clutch being so constructed, however, as to act instantly and concurrently with the throwing on of the power which attracts the trolley pole; to provide in conjunction with the mechanism last referred to means for automatically restoring the clutch to its normal position after it has performed its function; to provide a mechanism which enables compressed air to be used as the source of power by which to effect the retracting of the trolley and which is also employed as a positive means of restoring the mechanism to its normal position; and in general to provide improved details of construction and arrangement all contributing toward the general object of providing a comparatively simple and effective mechanism for the purpose described.

To the above ends the invention consists in the matters hereinafter described, and more particularly pointed out in the appended claims.

Figure 1:
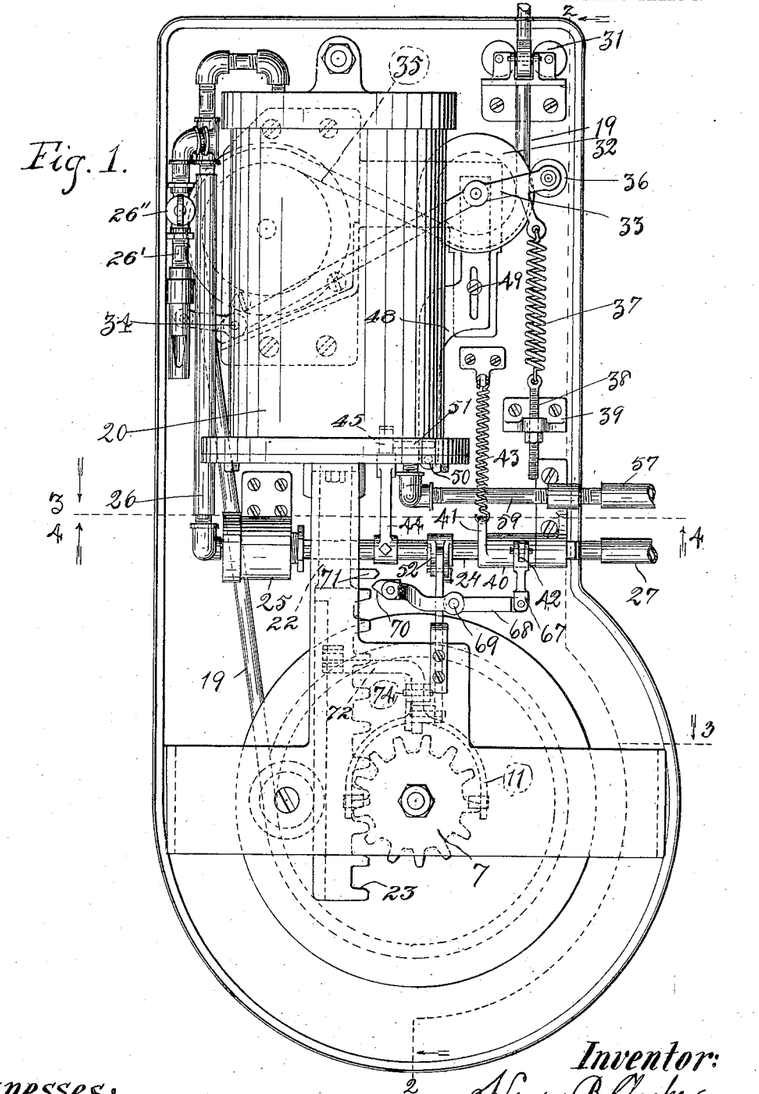
Figure 1 is a side elevation of the mechanism with the casing removed.
Figure 2:
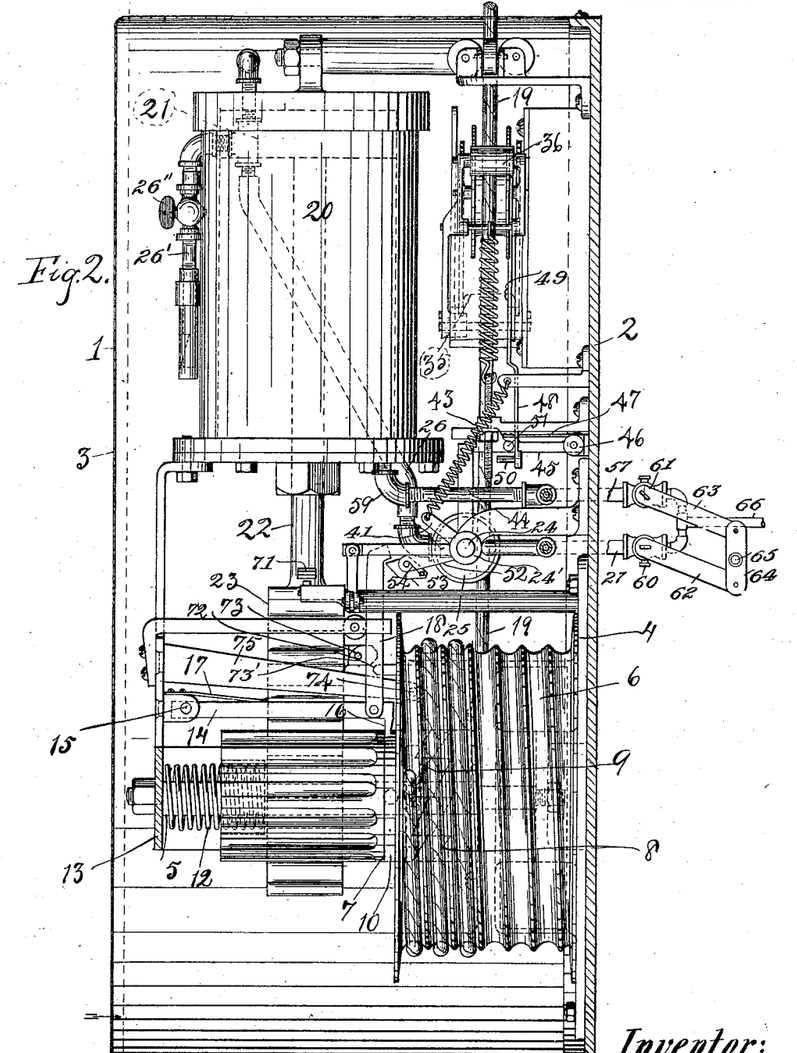
Fig. 2 is a front elevation of the same, the casing being shown in section on the indirect line 2—2 of Fig. 1.

Referring first to Figs. 1 and 2, 1 designates as a whole a suitable casing comprising a relatively heavy side plate 2 which forms the support or base plate, so to speak, upon which the interior mechanism is chiefly mounted, and a sheet metal casing member 3 constructed to fit over the mechanism and at its margin secured to the side plate 2.

4 designates a base plate bolted rigidly to the side plate 2 and carrying a spindle 5 projecting at right angles therefrom and upon which are journaled a drum 6 and a gear 7. In that end of the hub of the drum next to the gear 7 is formed a series of clutch teeth, as indicated at 8, and, similarly, the end of the gear 7 is provided with a corresponding series of clutch teeth 9. The gear member is also provided with a circumferential fork groove 10 which is engaged by a clutch shifting fork 11, and a coiled spring 12 interposed between the opposite end of the gear and a suitable supporting bracket 13, through which the end of the shaft 5 extends, tends to normally force the clutches into engagement. The gear 7 is, however, normally held free from the drum 6 by means of a latch 14 pivoted to the support 13, as indicated at 15, and provided at its opposite end with a hook 16 which engages the fork groove of the gear; the latch being spring-pressed, as indicated at 17, and retracted to release the gear and allow it to interclutch with the drum by means of a tappet link 18, which is actuated as will hereinafter more fully appear.

Figure 8:
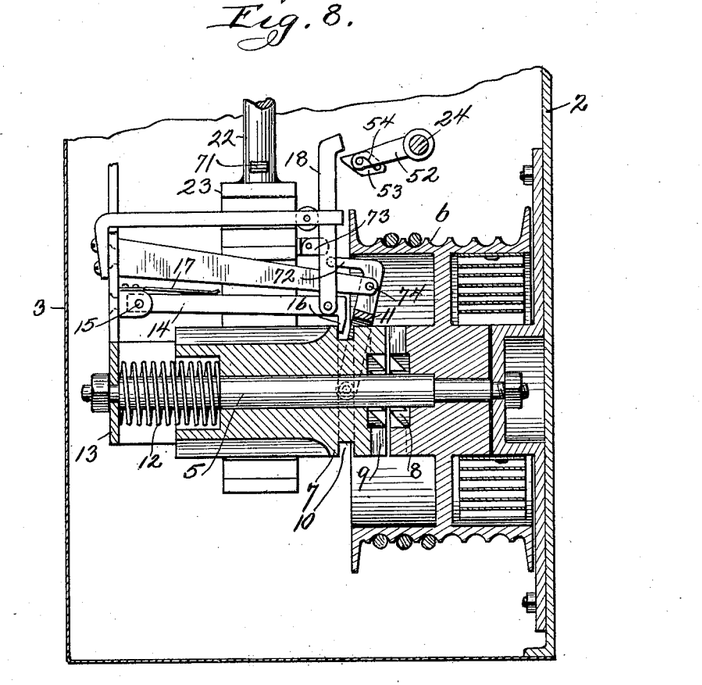
Fig. 8 is a vertical section taken axially through the drum shown in the lower part of Fig. 2.
Figure 9:
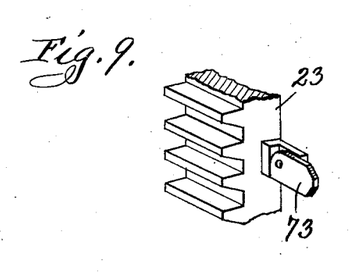
Fig. 9 is a detail view of the stud which actuates the shipping fork.

The drum 6 is provided internally with a spiral spring which tends constantly to rotate it in a direction to wind up the trolley cord 19 connected therewith and wound thereupon; the details of this winding spring being shown in Fig. 8, but they may be of any usual well understood construction, and it being understood that this spring is so tensioned as to keep the trolley cord taut, though, of course, not strong enough to retract the trolley from the wire.

In order to actuate the gear 7 positively, and through it the drum 6, an air cylinder 20 is suitably mounted in the upper part of the casing, within which works a piston, indicated at 21 in dotted lines in Fig. 2, provided with a piston stem 22 which extends out through the lower end of the cylinder and carries at its lower end a rack 23 which engages the gear 7. The axial length of the teeth of the gear 7 are such as to permit the latter to shift into and out of clutch engagement with the drum without being disengaged from the rack.

In the normal position of the mechanism the piston 21 is at its uppermost limit of movement, and it is forced downwardly by air admitted into the upper end of the cylinder. To this end, a pipe 27, connected with any suitable source of air supply under pressure, leads in through the side of the casing 2 and connects with a valve casing 25, and from the opposite side of the latter a pipe 26 leads upwardly to and connects with the upper end of the cylinder. A valve stem 24' extends into the valve casing and is susceptible of a limited oscillatory movement upon its own axis. Connected to the end of the valve stem 24' inside of the valve casing is a valve plug member 28 provided with a port 29 adapted to be brought into, or carried out of, register with a corresponding port 30 in the valve casing which communicates with the pipe 26.

Air is admitted to the cylinder 20 automatically whenever the trolley jumps the trolley wire. To effect this end, the trolley cord 19 is brought downwardly from the trolley pole through a group of guide pulleys 31, passes thence around a pulley 32 mounted upon the swinging end of a throttle lever 33 which is pivoted, as indicated at 34, to a suitable fixed support on the casing and thence passes around a guide pulley 35 so disposed with relation to the pulley 32 as to deflect the trolley cord at an abrupt angle. From the guide pulley 35 the cord passes downwardly to and around the drum 6. The throttle lever carries also a confining roller 36 which is supported just beyond the periphery of the roller 32 and in position to confine the trolley cord in engagement with the groove of the latter. The throttle lever is normally held backward against the tension of the trolley cord by means of a coiled contraction spring 37 secured to the outer end of the lever at one end, and at its opposite end to an adjusting screw 38 threaded through a suitable bracket 39. The tension of this spring 37 is such that when the trolley jumps the wire the sudden increase of tension on the cord will jerk the throttle lever upwardly some distance before the inertia of the drum and frictional resistance on the pulleys due to the abrupt turns in the cord passing thereover are overcome. This drawing upwardly of the throttle lever is made to serve as the means of opening the valve which sets into operation the retracting mechanism. Describing said mechanism, upon the valve stem 24' is rigidly secured a sleeve 40 provided with two crank arms 41 and 42, respectively, and to the arm 41 is attached a coiled contractile spring 43 which tends constantly to rotate pipe 27 in one direction. The valve stem 24' carries another rigid arm 44 which extends upwardly (see Fig. 2) and is normally held against movement under the action of spring 43 by a stop standard 45 pivoted on a suitable support, as indicated at 46, and projecting horizontally outward in position to encounter the end of arm 44. The stop standard 45 is held yieldingly in its position by a spring 47. 48 designates a slide which is mounted to reciprocate on suitable pins or screws 49 extending through a slot therein and is operatively connected at one end to the throttle lever 33 so as to move with the latter. At its opposite end, said slide carries a pin 50 which is adapted to engage a corresponding pin 51 projecting at right angles from the stop standard 45 in such manner as to withdraw the latter from engagement with the arm 44. When thus released, the rotation of the valve stem 24' opens the valve 25 in a manner hereinbefore described and thus admits air to the cylinder. To permit the air to escape from the upper part of the cylinder on the upward stroke of the piston, a pipe 26' communicates with the pipe 26, and is provided with a cock 26'', whereby the escape of air can be regulated. This pipe 26' is shown provided with an air-whistle which operates as soon as the air is admitted to the upper end of the cylinder and continues until the mechanism is restored. The whistle may be dispensed with. At the same time that the valve is opened, the clutch mechanism is automatically thrown into action, this being accomplished as follows: Upon valve stem 24' is fixedly secured still another arm 52 which at its outer end carries a pawl 53 (see Fig. 2) which in the advance stroke of the arm engages the link 18 hereinbefore referred to, and which link is connected with the latch member 14 in such manner as to withdraw or lift the latter. Lifting this latch permits the clutch gear to shift under the action of spring 12 as described. Upon the return oscillation of the valve stem 24' the pawl 53 oscillates idly in passing the hooked end of the link 18; this movement being permitted by a spring 54 acting on the pawl.

Figure 5:
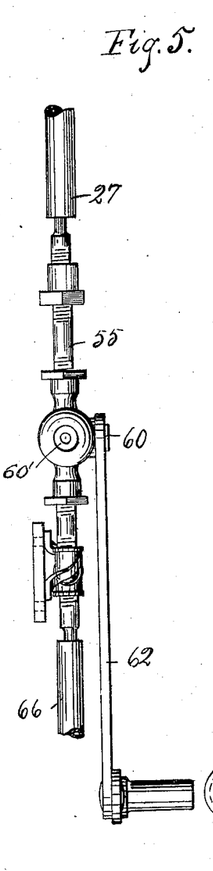
Fig. 5 is a side or edge elevation of a turncock mechanism and associated pipe.
Figure 6:
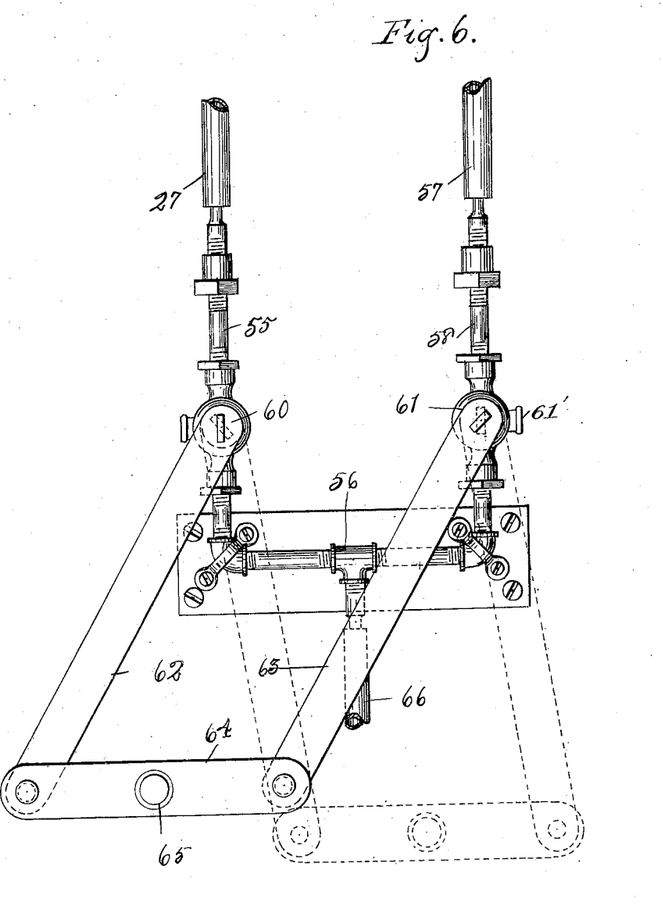
Fig. 6 is a front elevation of the same.
Figure 7:
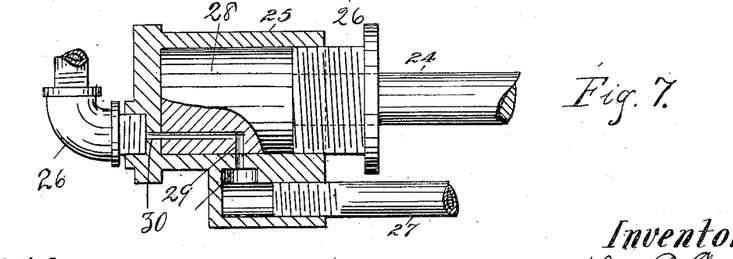
Fig. 7 is a sectional detail of the throttle valve.
Figure 10:
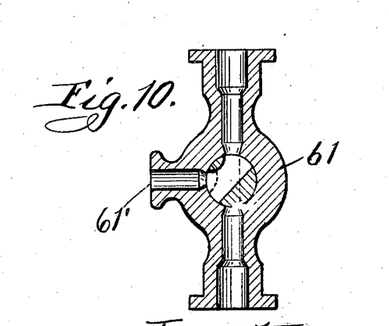
Fig. 10 is a sectional detail view of one of the two-way valves shown in Fig. 6.

The air having been turned on, and the gear clutched to the drum by the same movement of the valve stem 24', the piston descends, thus rotating the drum and drawing down the trolley through the action of the trolley cord. The piston having reached the lower end of the cylinder it remains in this position until the air pressure is turned off as to the upper end of the cylinder and admitted to its lower end, whereupon the piston returns to its normal uppermost position. The reversal of the piston is accomplished by the conductor through the mechanism illustrated in Figs. 5 and 6. Describing said mechanism, the flexible hose coupling 27 connected with pipe 27 connects with one branch 55 of a T-union 56, and in a similar manner a flexible hose section 57 is connected at one end with the other branch 58 of the T-union and at its opposite end with a pipe 59 which leads to and connects with the lower end of the cylinder 20. In the branches 55 and 58 are turncocks 60 and 61, respectively, connected to rotate together by means of a pair of arms 62 and 63 and a connecting link 64; the latter being provided with a handle 65 and the turncocks being so disposed that when the handle is shifted to its limit in one direction branch 55 will be open and branch 58 closed, and when shifted in the opposite direction, the connections reversed. The two branches 55 and 58 communicate through the T-union 56 with a pipe 66 connected with any suitable source of air under pressure. It will be understood that the mechanism shown in Figs. 5 and 6 may be located in any convenient part of the car. To allow the air to escape from the lower part of the cylinder on the downward stroke of the piston, the turn-cock 61 is a two-way cock, as shown in Fig. 10. Normally air is shut off from the supply pipe 66, the valve being in the position shown in Fig. 10 and open as to the lower part of the cylinder through the outlet 61'.

Figure 3:
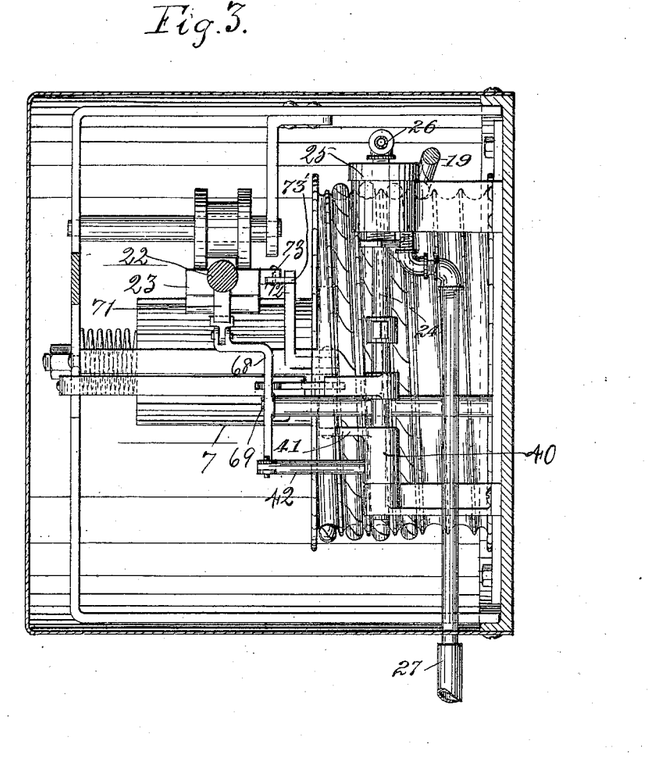
Fig. 3 is a cross sectional view taken on line 3—3 of Fig. 1 and looking downwardly.
Figure 4:
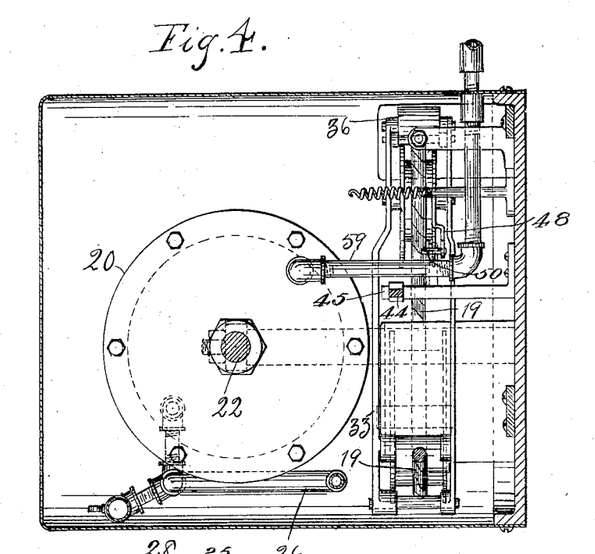
Fig. 4 is a cross sectional view taken on the same line 3—3 of Fig. 1 and looking upwardly.

As the piston is returned to its uppermost or normal position it operates to restore the automatic throttle mechanism to normal. To this end the arm 42 on valve stem 24', hereinbefore referred to, is connected by means of a link 67 with a restoring lever 68 pivoted between its ends on a suitable support, as indicated at 69, and carrying at its free end a tappet pawl 70 which is free to oscillate idly in one direction but is rigid with the lever against movement in the opposite direction. Upon the piston stem 22 is an arm or stud 71 which projects into position to encounter the tappet pawl 70 during the up and down movements of the piston. When the valve stem 24', and with it the arm 42, moves forwardly under the action of spring 43, lever 69 is oscillated to carry its free end downwardly, and upon the return or upward stroke of the piston arm 71 engages the lever 68 and rotates the stem 24′ and connected arms to their normal positions, the arm 41 swings back against the action of the spring 43, arm 44 moves into engagement with the stop standard 45 which has been automatically restored to its normal position by the action of its spring, and the pawl 53 oscillates idly in passing the end of link 18, as previously described. Means are also provided for automatically disengaging the clutch during the return movement of the piston, and this is accomplished by another stud 73 carried by the piston stem and projecting at right angles rearwardly from the rack portion thereof, as best seen in Fig. 3. The shipping yoke 11, hereinbefore referred to, is pivoted intermediate its length as indicated at 74 (see Figs. 1 and 2) upon a bracket arm 75 extending from the frame member 13. The shank portion of the shipping fork is deflected at right angles so that its end portion 72 projects into the path of the stud 73 hereinbefore referred to (see Fig. 3), and the end of the stud 73 carries a tappet pawl 73′ free to oscillate idly in one direction and rigid against oscillation in the other and beveled at both sides, as is also the end of the shipping fork so that said parts coöperate cam-fashion during the up and down stroke of the piston. On the downward movement of the piston, the pawl 73′ rotating on its pivot wipes by the end of extension 72. On the upward stroke, the pawl 73′ engages 72 and actuates the shipping fork, which swings back on its pivot at 74 and forces the gear 7 out of engagement with the drum. The hook 16 under the action of its spring now engages and holds the gear away from the drum.

The operation of the mechanism, constructed as described, has been clearly set forth in conjunction with the description of its construction and need not therefore be repeated. The operation may be briefly recapitulated, however, as follows: The retracting mechanism being suitably supported on the dashboard or other convenient support upon the end of the car, and the trolley cord suitably connected therewith, the clutch gear is normally held out of engagement with the winding drum and the latter oscillates freely under the action of the trolley pole and its own winding spring. In case the trolley jumps the track, a sudden jerk on the throttle lever opens the valve and turns on the air, and at the same time withdraws the latch 14 from the groove of the clutch gear and allows the latter to shift into engagement with the drum. The descending piston rotates the drum and winds up the trolley cord, thus retracting the trolley pole instantly and preventing it from encountering cross wires or other overhead parts. The piston having reached its lower limit of movement, remains in this position until the conductor releases it by reversing the air, whereupon the piston instantly ascends, and in so doing restores everything to normal position; it being understood that the conductor will at the same time adjust the trolley wheel into engagement with the wire. After the piston has been permitted to ascend the conductor will, of course, return the reversing valve mechanism to its normal position.

From the foregoing description it will be understood that I accomplish the several objects of the invention hereinbefore stated, and provide a mechanism which is extremely prompt, reliable and effective in operation.

Inasmuch as the power necessary to actuate the retracting mechanism is supplied by the air, certainty of action is assured, and moreover the governing mechanism is relieved of all unnecessary tension and friction, and may therefore be made so sensitive as to be extremely certain and reliable in its action. The mechanism is so constructed as to be extremely compact and readily contained within the comparatively small casing, so that the device can be shifted from one end of the car to the other, or from car to car, with great facility.

It will be understood that the details of construction and arrangement may be modified without departing from the spirit of the invention.

I claim as my invention:

1. In a trolley retracting mechanism, the combination of an automatically rotating drum and trolley cord connected therewith, a gear, a clutch mechanism adapted to connect said gear and drum to rotate positively together, a cylinder and piston therein, operative connections between the piston and said gear, a source of elastic fluid pressure communicating with said cylinder, a throttle mechanism, and means operatively connected with said trolley cord and brought into operation by sudden tension upon the latter for actuating said throttle mechanism.

2. In a trolley retracting mechanism, the combination of an automatically rotating drum and trolley cord connected therewith, a gear, a clutch mechanism adapted to connect said gear and drum to rotate positively together, a cylinder and piston therein, operative connections between the piston and said gear, a source of elastic fluid pressure communicating with said cylinder, a throttle mechanism, a spring retracted throttle arm, a guide carried by said arm, around which the trolley cord is trained and held deflected at an abrupt angle to the line of draft between the trolley and winding drum, a valve controlling the admission of air to said cylinder, and operative connections between said throttle lever and valve.

3. In a trolley retracting mechanism, the combination of an automatically rotating drum and trolley cord connected therewith, a gear, a clutch mechanism adapted to connect said gear and drum to rotate positively together, a cylinder and piston therein, operative connections between the piston and said gear, a source of elastic fluid pressure communicating with said cylinder, a throttle mechanism, a spring retracted throttle arm, a guide carried by said arm, around which the trolley cord is trained and held deflected at an abrupt angle to the line of draft between the trolley and winding drum, a spring actuated valve arranged to control the admission of air to the cylinder, a detent normally holding said valve closed, and operative connections between said detent and the throttle lever whereby the operation of the latter serves to release the detent and open the valve.

4. In a trolley retracting mechanism, the combination of a spring-operated winding drum and trolley cord connected therewith, a gear, a clutch mechanism adapted to connect said gear and drum to rotate positively together, a cylinder and piston therein, a piston rod connected with the piston and carrying a rack operatively connected with said gear, a source of elastic fluid pressure communicating with said cylinder, a throttle mechanism, means operatively connected with the trolley cord and brought into operation by sudden tension upon the latter for actuating said throttle mechanism, a spring tending to normally throw said clutch mechanism into engagement, a detent mechanism normally holding said clutch retracted, and operative connections between said detent mechanism and said throttle mechanism whereby said mechanisms are brought into operation simultaneously.

5. In a trolley retracting mechanism, the combination of a spring-operated winding drum and trolley cord connected therewith, a gear, a clutch mechanism adapted to connect said gear and drum to rotate positively together, a cylinder and piston therein, a piston rod connected with the piston and carrying a rack operatively connected with said gear, a source of elastic fluid pressure communicating with said cylinder, a throttle mechanism, means operatively connected with the trolley cord and brought into operation by sudden tension upon the latter for actuating said throttle mechanism, a spring tending to normally throw said clutch mechanism into engagement, a detent mechanism normally holding said clutch retracted, operative connections between said detent mechanism and said throttle mechanism whereby said mechanisms are brought into operation simultaneously, and operative connections between the piston and clutch mechanism whereby during the return movement of the piston the clutch mechanism is restored to its normal disengaged position.

6. In a trolley retracting mechanism, the combination of a spring-operated winding drum and trolley cord connected therewith, a gear, a clutch mechanism adapted to connect said gear and drum to rotate positively together, a cylinder and piston therein, a piston rod connected with the piston and carrying a rack operatively connected with said gear, a source of elastic fluid pressure communicating with said cylinder, a throttle mechanism, means operatively connected with the trolley cord and brought into operation by sudden tension upon the latter for actuating said throttle mechanism, a spring tending to normally throw said clutch mechanism into engagement, a detent mechanism normally holding said clutch retracted, operative connections between said detent mechanism and said throttle mechanism whereby said mechanisms are brought into operation simultaneously, and operative connections between the piston and throttle mechanism whereby during the return of the piston the throttle mechanism is restored to its normal position.

7. In a trolley retracting mechanism, the combination of a spring-operated winding drum and trolley cord connected therewith, a gear, a clutch mechanism adapted to connect said gear and drum to rotate positively together, a cylinder and piston therein, a piston rod connected with the piston and carrying a rack operatively connected with said gear, a source of elastic fluid pressure communicating with said cylinder, a throttle mechanism, means operatively connected with the trolley cord and brought into operation by sudden tension upon the latter for actuating said throttle mechanism, a spring tending to normally throw said clutch mechanism into engagement, a detent mechanism normally holding said clutch retracted, operative connections between said detent mechanism and said throttle mechanism whereby said mechanisms are brought into operation simultaneously, and operative connections between the throttle mechanism and piston and between the clutch mechanism and piston whereby both of said mechanisms are restored to normal during the return movement of the piston.

8. In a trolley retracting mechanism, the combination of a spring operated winding drum and trolley cord connected therewith, a spring-pressed end-wise shiftable gear mounted concentrically with the winding drum, clutch teeth carried respectively by the drum and gear and adapted to interengage when the gear is shifted to the drum, a cylinder and piston therein, a piston rod connected with the piston and carrying a rack operatively engaging said gear, a source of elastic fluid pressure communicating with one end of said cylinder, a throttle mechanism comprising a throttle lever carrying a guide around which the trolley cord is trained and held deflected at an abrupt angle to the line of draft between the trolley and spring drum, a spring connected to the throttle lever and exerting its tension to hold the lever deflected against the tension on the trolley cord, a rocking member, a throttle valve operatively connected with said rocking member and controlling an admission port to the cylinder, a spring tending to normally move said rocking member into position to open the throttle valve, a detent normally holding said rocking member against movement, and operative connections between said detent and said throttle lever.

9. In a trolley retracting mechanism, the combination of a spring-operated winding drum and trolley cord connected therewith, a spring-pressed end-wise shiftable gear mounted concentrically with the winding drum, clutch teeth carried respectively by the drum and gear and adapted to interengage when the gear is shifted to the drum, a cylinder and piston therein, a piston rod connected with the piston and carrying a rack operatively engaging said gear, a source of elastic fluid pressure communicating with one end of said cylinder, a throttle mechanism comprising a throttle lever carrying a guide around which the trolley cord is trained and held deflected at an abrupt angle to the line of draft between the trolley and spring drum, a spring connected to the throttle lever and exerting its tension to hold the lever deflected against the tension on the trolley cord, a rocking member, a throttle valve operatively connected with said rocking member and controlling an admission port to the cylinder, a spring tending to normally move said rocking member into position to open the throttle valve, a detent normally holding said rocking member against movement, operative connections between said detent and said throttle lever, a latch mechanism arranged to normally hold the gear out of engagement with the winding drum against the tension of its spring, and operative connections between said rocking member and said latch mechanism whereby the throttle valve is opened and the gear released and shifted into operative engagement simultaneously.

10. In a trolley retracting mechanism, the combination of a spring-operated winding drum and trolley cord connected therewith, a spring-pressed end-wise shiftable gear mounted concentrically with the winding drum, clutch teeth carried respectively by the drum and gear and adapted to interengage when the gear is shifted to the drum, a cylinder and piston therein, a piston rod connected with the piston and carrying a rack operatively engaging said gear, a source of elastic fluid pressure communicating with one end of said cylinder, a throttle mechanism comprising a throttle lever carrying a guide around which the trolley cord is trained and held deflected at an abrupt angle to the line of draft between the trolley and spring drum, a spring connected to the throttle lever and exerting its tension to hold the lever deflected against the tension on the trolley cord, a rocking member, a throttle valve operatively connected with said rocking member and controlling an admission port to the cylinder, a spring tending to normally move said rocking member into position to open the throttle valve, a detent normally holding said rocking member against movement, operative connections between said detent and said throttle lever, a latch mechanism arranged to normally hold the gear out of engagement with the winding drum against the tension of its spring, operative connections between said rocking member and said latch mechanism whereby the throttle valve is opened and the gear released and shifted into operative engagement simultaneously, a shipping fork operatively engaged with said gear, and a cam projection carried by the rack and acting upon the shipping fork to return the gear to latched position during the return movement of the piston.

11. In a trolley retracting mechanism, the combination of a spring-operated winding drum and trolley cord connected therewith, a spring-pressed, end-wise shiftable gear mounted concentric with the winding drum, clutch teeth carried respectively by the drum and gear and adapted to interengage when the gear is shifted to the drum, a cylinder and piston therein, a piston rod connected with the piston and carrying a rack operatively engaging said gear, a source of elastic fluid pressure communicating with one end of said cylinder, a throttle mechanism comprising a throttle lever carrying a guide around which the trolley cord is trained and held deflected at an abrupt angle to the line of draft between the trolley and spring drum, a spring connected to the throttle lever and exerting its tension to hold the lever deflected against the tension on the trolley cord, a rocking member, a throttle valve operatively connected with said rocking member and controlling an admission port to the cylinder, a spring tending to normally move said rocking member into position to open the throttle valve, a detent normally holding said rocking member against movement, operative connections between said detent and said throttle lever, and means for restoring said rocking member to normal during the return stroke of the piston comprising a pivoted lever operatively connected with the rocking member and a tappet projection carried by the piston rod and into the path of which said pivoted lever extends, substantially as described.

12. In a trolley retracting mechanism, the combination of an automatically rotating drum and trolley cord connected therewith, a gear, a clutch mechanism adapted to connect said gear and drum to rotate positively together, a cylinder and piston therein, operative connections between the piston and said gear, a source of elastic fluid pressure communicating with said cylinder, a throttle mechanism, means operatively connected with said trolley cord and brought into operation by sudden tension upon the latter for actuating said throttle mechanism, a manually actuated valve mechanism for reversing the fluid pressure upon said piston and returning the latter to its normal position.

HENRY B. CLARKE.

Witnesses:
EMILIE ROSE,
ALBERT H. GRAVES.